United States Patent [19]

Dévényi et al.

[11] 4,391,839

[45] Jul. 5, 1983

[54] METHOD OF MODIFYING THE CONFORMATION OF FOOD AND FEED PROTEINS

[75] Inventors: Tibor Dévényi; Klára K. Bócsa; Ferenc Kováts; Sandor Pongor; Gertrud Szabolcsi; Mihály Such, all of Budapest, Hungary

[73] Assignee: MTA Szegedi Biologiai Kozpont Enzimologiai Intezete, Budapest, Hungary

[21] Appl. No.: 247,645

[22] Filed: Mar. 26, 1981

Related U.S. Application Data

[63] Continuation-in-part of Ser. No. 179,980, Aug. 21, 1980, abandoned.

[30] Foreign Application Priority Data

Dec. 21, 1979 [HU] Hungary .............................. MA 3255

[51] Int. Cl.³ .............................................. A23K 1/00
[52] U.S. Cl. .................................... 426/626; 426/623; 426/630; 426/656; 426/807
[58] Field of Search ...................... 426/623, 630, 2, 46, 426/626, 656, 807

[56] References Cited

U.S. PATENT DOCUMENTS

| | | | |
|---|---|---|---|
| 3,852,480 | 12/1974 | Williams | 426/46 |
| 4,147,810 | 4/1979 | Kellor | 426/656 X |
| 4,185,121 | 1/1980 | Huster et al. | 426/656 X |
| 4,243,686 | 1/1981 | Israilides et al. | 426/626 X |

OTHER PUBLICATIONS

"Soybeans Chemistry & Technology", vol. 1, Protein Avi Publishing Co., Smith (Editor), Copyright 1978, pp. 128, 132–133, 300–301 & 306–307.

Soybeans & Soybean Products, vol. 1, Interscience Publishers (1950), Markley (Editor), pp. 386–407.

*Primary Examiner*—R. B. Penland
*Attorney, Agent, or Firm*—Karl F. Ross; Herbert Dubno

[57] ABSTRACT

The invention relates to a method for modifying the conformation of plant proteins for increasing their biological utilization, which comprises treating said plant protein with gaseous hydrogen chloride to adjust its pH to a value between 1.6 and 2.4, as measured in a 20% by weight aqueous suspension, for a period sufficient to increase the digestibility of said protein without bringing the protein into solution or suspension, and thereafter bringing the pH of said protein to a value between 4 and 7 with an alkalizing agent, wherein the moisture content of said protein is increased with the alkalizing agent at most to 50% by weight.

5 Claims, No Drawings

METHOD OF MODIFYING THE CONFORMATION OF FOOD AND FEED PROTEINS

CROSS REFERENCE TO RELATED APPLICATION

This application is a continuation-in-part of Ser. No. 179,980 filed Aug. 21, 1980, now abandoned.

FIELD OF THE INVENTION

This invention relates to a method of modifying the conformation of food and feed proteins for increasing their biological utilization, i.e. their nutritive value.

BACKGROUND OF THE INVENTION

It is commonly known that most countries are short of protein-rich nourishment. Malnutrition is a serious problem in the developing countries whereas the developed countries are lacking in fodder and feed proteins, which means that meat production from plant proteins is insufficient. With increasing demand for plant proteins and with rising prices, research work has had two main directions in this field. Exploitation of the existing supply can be increased by the addition of enzymes and other substances and, on the other hand, new protein sources are sought by plant breeding and by new agricultural technology. Some research has been done to increase protein utilization by heat treatment, too.

The utilization of food and feed proteins is very low, somewhere between 25% and 40% even under optimum conditions. Addition of enzymes and other substances does not lead to a significantly higher value, whereas heat treatment only indirectly leads to a higher rate of utilization. This fact can be explained by the mistaken belief that the material obtained by heat treatment contains completely denatured, easily digestible protein. This supposition may be derived from the well-known fact that proteins—except for a few thermophilic proteins—are heat sensitive in their solutions and are denatured at a relatively low temperature (around 50° C.), which leads to a significant increase in their proteolytic digestibility whereas natural proteins can only very slowly be digested by proteolytic enzymes. In all probability these observations have led to the fallacy that easily digestible, denatured feed-proteins can be obtained by subjecting plant materials, such as fodder meals to dry heat treatment or steaming such as is carried out after extraction of oil seeds. The fallacy of this conclusion is shown by the fact that a wool-like regenerated fiber can be produced from the protein fraction of commercial feed-proteins, proving that these proteins maintain their property to associate which characterizes proteins only in their native state. In vitro experiments have also shown that only 50-60% of these proteins can be digested. This limited digestibility explains their low and uneconomical utilization in vivo.

The use of various leguminous plants, like soybeans, and other oilseeds has become general in nutrition all over the world. The nutritive value of these plants is high since they contain 20-40% of protein of high quality, providing a balanced amino acid supply. The drawback of these materials is that they contain different antinutritive substances, like trypsin inhibitors and antivitamin factors. Fortunately, these can usually be inactivated by heat treatment.

In the human diet, leguminous plants are used in cooked form, whereas products from oil seeds are prepared after defatting, heat treatment and drying. Fodder is usually uncooked, but oil seeds are used as defatted, extracted grist. Among the plants of high protein content soybean is processed in the greatest amounts. This process includes extraction with hexane or other solvents but no chemical treatment is used in the process. In this method the time of heat treatment and the control of humidity are of particular importance. The nutritive property of the products can be determined in different chemical, enzymatic and biological assays. In the most commonly used biological test, the so-called Protein Efficiency Ratio (PER) is determined with test animals. This value—determined with growing rats as test animals—is usually between 1.0-1.3 for raw soybeans, 1.4-1.6 for the moderately processed material and 2.2-2.4 for the completely processed material (e.g. treatment at 100° C. for 15 minutes).

Our investigations have shown that the utilization of soybeans having even the highest PER value is not sufficient since the proteins obtained by the known procedures are not irreversibly denatured.

For the food industry materials of high protein content are desirable. To obtain such materials, defatted plant grits are extracted with aqueous solutions at the isoelectric pH of the constituent proteins. In another commonly used procedure, proteins are dissolved at a slightly alkaline pH and subsequently precipitated at isoelectric pH. Both methods entail a considerable loss of protein (Wilcke et al., J. Am. Oil. Chem. 56, 259–261; 1979).

Several chemical procedures are known also for the chemical treatment of feeds and fodders. The aim of these treatments is usually the production of milk substitutes for young animals. The following procedure can be mentioned as an example: soybean grist is partially hydrollyzed by exhaustive treatment with hydrogen chloride gas (Jones et al.: J. Anim. Sci. 45, 1073–1078; 1977). This treatment lowers the pH below 0.4 which, during the long exposure time (7 days) used in the cited procedure, leads to the hydrolysis of the treated material. As a result a highly soluble material is obtained containing large amounts of free amino acids and smaller peptides.

The aim of the chemical treatment is sometimes to decrease the high buffer capacity of the fodder which is deleterious to young animals. The buffer capacity can be influenced by adding strong electrolytes, such as sodium hydroxide, phosphoric or hydrochloric acid, or by adjusting the pH to 4 (Colvin B. M., Ramsey, H. A.; J. Dairy Sci. 51, 898–904; 1968).

OBJECT OF THE INVENTION

The object of the invention is to provide a simple chemical method for increasing the utilization of food and feed proteins.

DESCRIPTION OF THE INVENTION

The invention is based on the recognition that by adjusting the pH of food and feed proteins to a value between 1.6 and 2.4 the biological utilization of the proteins significantly increases. (In the case of solid food and feed materials the term pH is used as the pH determined in a 20 w/w % aqueous suspension.)

Furthermore, it has been stated that between the pH values 1.6 and 2.4 proteins undergo an irreversible conformational change. An important consequence of this change is that they lose their property to associate and form fibers. A direct proof of the conformational change is that after this chemical treatment, plant proteins become more susceptible to cleavage by proteolytic enzymes. The conformational change can be demonstrated by polyacrylamide gel-electrophoresis carried out in the presence of sodium dodecyl sulphate (SDS-PAGE) (Weber and Osborn.: J. Biol. Sci. 244, 4406–4412; 1969). The SDS-PAGE pattern of the tryptic digestion product is different in the case of the treated and the untreated proteins. This method provides a tool also to distinguish the proteins treated by the present procedure between pH values of 1.6 and 2.4 from those treated below or above these values. Namely, in the case of proteins treated above pH=3.0, the SDS-PAGE pattern of the tryptic hydrolyzate practically cannot be distinguished from that of the untreated material. On the other hand, in the case of proteins treated below pH=0.5 both the SDS-PAGE pattern of the tryptic hydrolyzate and that of the not digested sample can be distinguished from the corresponding patterns of the material processed according to the invention.

Furthermore, it has been stated that the above conformational change can be induced without bringing the protein into solution or suspension phase. Clearly, the effect can be produced by wetting the protein carrier with an inorganic acid without changing its consistency or by a short exposure to hydrogen chloride gas. Protein source materials treated in this way can be stored without the risk of microbial deterioration; a partial neutralizing depending on the physiological needs of the organism to be fed may, however, be required in some cases. By a proper choice of the acid and the neutralising agent, the whole procedure can be carried out in such a way that no further drying or any other energy-consuming separation step will be required before feeding the treated material to animals.

Accordingly, the invention relates to a method for modifying the conformation of plant proteins of cereal, vegetable or oil-seed origin for increasing their biological utilization, which comprises:

treating said plant protein with a strong inorganic acid to adjust its pH to a value between 1.6 and 2.4, as measured in a 20% by weight aqueous suspension, for a period sufficient to increase the digestibility of said protein, and thereafter, if desired, bringing the pH of said protein to a value between 4 and 7 with an alkalizing agent, wherein the moisture content of said protein is increased with the acid and the alkalizing agent at most to 50% by weight.

The pH of the plant protein is preferably adjusted to a value between 1.7 and 2.3.

Thus the invention provides, in contrast to the known procedures, a method for modifying the conformation of food and feed proteins by a chemical treatment between pH=1.6 and 2.4, under conditions where no protein hydrolysis takes place.

According to a preferable method of the invention the protein-containing material is treated with an acid until reaching a pH value between 1.8 and 2.2, whereafter, if desired, the pH is increased to a value between 4 and 5.

The invention is particularly useful for treating plant materials of high protein content, like beans, soybeans, peas, lupine seeds; crops, like wheat, barley, rye, corn, rice, broomcorn; oilseeds, like peanuts, sunflower seeds, rapeseeds the separated fractions thereof and the by-products of their processing. Alternatively, fodder of lower protein but higher carbohydrate content may also be subjected to this treatment.

In carrying out the invention, any kind of inorganic acid can be used. Suitable inorganic acids are hydrochloric acid, sulphuric acid, phosphoric acid and nitric acid.

They can be used in concentrated or dilute form or as vapor or gas. The acid can be diluted with water or with a salt solution. A particularly suitable diluting agent is the aqueous solution of other substances or additives used in the fodder. A combination of different acids can be applied, too.

Slaked lime, caustic soda, potassium hydroxide or calcium carbonate can be used for neutralizing the acid. The neutralizing agent can be used in concentrated or diluted form. The neutralization is preferably carried out in the equipment used for the treatment with acid.

The process of the invention is independent of the temperature. Therefore it can be carried out within a large temperature range, in practice between 0° C. and 100° C. Depending on technical equipments and accessories, batchwise or continuous technology can be applied.

The product of the invention can be further processed for foddering purposes in several ways. If the moisture content has been adjusted to the desirable level, drying—which otherwise can be performed in any kind of desiccator—is not necessary. The various additives, e.g. premixes, should then be added according to the technology to be used. All preparatory operations can be carried out without drying, too.

With to the treatment according to the invention, the essential amino acid content of the proteins does not change, whereas the nutritive value considerably increases, as it can be demonstrated in animal feeding tests. For example, the PER value of the defatted soybean meal, as determined on growing rats, increased from $76 \pm 1.5\%$ to $85 \pm 1.3\%$, i.e. by 12%, as a result of a treatment according to the invention.

The biological utilization of the treated and untreated soybean grists has been compared with large scale feeding experiments performed on broiler chickens. The main parameters and the results of this experiment are summarized in Table 1.

TABLE 1

|  | Test Group (fed with acid-treated soybean) | Control Group (fed with untreated soybean) |
| --- | --- | --- |
| Number of broiler chickens | 28,000 | 28,000 |
| Soybean content of feed* | | |
| 1–11 days | 15.2% | 21% |
| 12–49 days | 17.6% | 22% |
| Average live weight | 1.25 kg | 1.19 kg |
| Fodder consumption/kg live weight | 2.16 kg | 2.21 kg |

*Feed composition was identical in both groups, lacking soybean was replaced by corn for the test group.

The data of the table show that animals used up 28% less of the treated soybeans than the control group, to reach the same live weight.

In an other experiment 4×150 white bacon pigs were fed for 60 days with fodder containing 12–14% less meat meal and the usual amount of soybean meal which had been processed according to the invention. For animals of live weight between 25 and 60 kg, the weight increase varied between 590 and 621 g/day in the test group, in contrast to the control group in which this value amounted to 560 g/day. For 1 kg of live weight gain the control animals consumed 3.26 kg of fodder whereas the pigs of the experimental group consumed only 2.76 to 2.92 kg of fodder.

In consequence of the treatment according to the invention, the in vitro digestibility of the protein is also improved. Proteolytic digestibility can be characterized by the amount of peptides soluble in 10% trichloroacetic acid (TCA) on treatment with trypsin for a given period of time (Kunitz: J. Gen. Physiol. 30, 291; 1947). The in vitro experiments were carried out as follows:

Finely ground samples containing 700 mg of protein were incubated with 30 ml of 0.1 M sodium borate buffer (pH=8.0) at 37° C. for 1 hour, then treated with 6 mg of bovine trypsine (Merck, 3×crystallized) for 20 minutes. To 2.5 ml. of this solution 1.25 ml of 30% TCA were added and the precipitated proteins were centrifuged at 15,000 rpm for 15 minutes. The amount of the TCA soluble peptides was determined by the biuret reaction (Jennings, Cereal Chem. 38, 476; 1961) and the blank value measured at zero time was substracted. Data were expressed in percent of the corresponding value of the control (untreated sample). Our experiments show that the treatment of soybean proteins by the method according to the invention increases the in vitro digestibility by 40 to 100%, on an average by 70%. In the case of sunflower seed meal an increase of 60% was found.

The main advantages of the process according to the invention are as follows:

(a) It provides a simple and inexpensive method to considerably increase the proteolytic digestibility of proteins, thus increasing their in vivo utilization, (b) The initial rate of proteolytic cleavage increases; consequently, proteins can be utilized even by those organisms in which the rate of digestion is slow.

(c) The nutritive value of the treated proteins becomes higher.

(d) Owing to its simplicity, the method can be adapted to any other known technology.

(e) Using treated proteins, by 12 to 28% less protein is needed to obtain the same amount of meat product.

The process of the invention is further illustrated by the aid of the following non-limiting Examples. The in vitro digestibility values as given in these Examples were determined by the above-described method.

EXAMPLE 1

The pH of 1 kg finely ground defatted soybean meal was adjusted to 2.0 with concentrated hydrochloric acid by continuous stirring. After stirring for 10 minutes 40 g of finely ground calcium carbonate were added and stirring was continued for about 10 minutes to ensure homogeneity. The in vitro digestibility of the product was increased by 85% as compared to the untreated material.

When treatment was carried out in the same way but at different pH values, the following results were obtained:

| pH | Increase in the in vitro digestibility |
|---|---|
| 1.6 | 35% |
| 2.0 | 85% |
| 2.4 | 40% |
| 3.0 | 15% |

EXAMPLE 2

50 kg of extracted soybean grist were mixed with 12 l of hydrochloric acid of technical grade in a Nautamix X 438,925 type mixing machine of high rpm value (Nautamix Europe B. V., Haarlem, The Netherlands). 2 kg of calcium carbonate were added to the homogeneous solution. Digestibility of the product increased by 60%.

EXAMPLE 3

50 kg of extracted ground sunflower seed were stirred first with 12 l of concentrated hydrochloric acid at 60° C. for 30 minutes, then with 1.8 kg of calcium hydroxide in the equipment described in Example 2. Digestibility of the product was 53% higher than that of the untreated material.

EXAMPLE 4

50 kg of ground white-lupine were spread out in 2 cm thick layers and sprinkled with 15 l of 25% hydrochloric acid. After turning over several times it was mixed with 2.3 kg of calcium-carbonate. The material was dried in a tray drier. The digestibility of the product increased by 42%, as compared to the untreated material.

EXAMPLE 5

50 kg of ground soybean were agitated in a hydrogen chloride atmosphere by intensive shaking for 1.5 minutes. Thereafter the material was thoroughly mixed with 2.0 kg of calcium hydroxide. Digestibility of the product increased by 58%.

EXAMPLE 6

25 kg of pea meal were agitated in a hydrogen chloride atmosphere with shaking, then 0.9 kg of calcium hydroxide was added. Digestibility increased by 44%.

EXAMPLE 7

25 kg of dried, extracted wheat-germ meal were treated in a hydrogen chloride atmosphere for 1 minute under intense agitation, then mixed with 0.7 kg of calcium hydroxide. In vitro digestibility of the product was 34% higher than that of the untreated control.

EXAMPLE 8

25 kg of barley grist in 2-3 cm thick layer were treated with 6 l of 25% hydrochloric acid, then, after turning over several times, neutralized with 0.5 kg of calcium carbonate. Digestibility of the product raised by 27%, as compared to the untreated control.

EXAMPLE 9

800 kg of soybean meal were agitated in a Nautamix MBX 20 R type conical circulating screw mixer (Nautamix Europe B. V., Haarlem, The Netherlands) at 70 rpm, then 90 l of 35% hydrochloric acid were added. After 30 minutes of stirring the material was dried on a tray drier. The in vitro digestibility of the product was by 65% higher than that of the untreated soybean meal.

What we claim is:

1. A method of modifying the conformation of plant proteins of cereal, vegetable or oil-seed origin for increasing their biological utilization, which consists essentially of:
    (a) treating said plant protein in dry form with agitation in gaseous hydrogen chloride for a period of about 1 to 1.5 minutes sufficient to increase the digestibility of said plant protein without bringing the protein into solution or suspension, said gaseous hydrogen chloride lowers the pH to a value between 1.7 and 2.3 as measured in a 20% w/v aqueous suspension; and
    (b) raising the pH of said plant protein to a value between 4 and 7 by adding calcium hydroxide, so that the moisture content of said plant protein is increased up to 50% by weight.

2. The method defined in claim 1, step (a), in which the pH of the plant protein is adjusted to a value between 1.8 and 2.2.

3. The method defined in claim 1, wherein the cereal protein is selected from the group consisting of wheat, barley and separated fractions thereof.

4. The method defined in claim 1, wherein the vegetable protein is selected from the group consisting of soybean, lupine, pea and separated fractions thereof.

5. The method defined in claim 1, wherein the oil seed-protein is sunflower or separated fractions thereof.

* * * * *